United States Patent Office.

NIVEN McCONNELL, OF MUNHALL, PENNSYLVANIA.

CHROME BRICK.

SPECIFICATION forming part of Letters Patent No. 578,351, dated March 9, 1897.

Application filed July 8, 1896. Serial No. 598,500. (No specimens.)

*To all whom it may concern:*

Be it known that I, NIVEN McCONNELL, of Munhall, in the county of Allegheny and State of Pennsylvania, have invented a new and useful Improvement in Chrome Bricks, of which the following is a full, clear, and exact description.

My invention relates to that class of refractory bricks known in the art as "chrome" bricks, and is designed to afford a new composition therefor, which, when burned, shall give a much stronger and less friable brick than has heretofore been obtained. These bricks have ordinarily been composed of chrome ore with a binder of tar or similar material, and when made up in this manner have proven to be very friable and short lived. I have discovered that by adding to the chrome ore a percentage of refractory clay and alkali matter a composition is afforded which, when burned, gives a very strong and durable article.

In carrying out my invention I preferably grind up the chrome ore and then add thereto a percentage of refractory clay, such as bauxite, and also a small portion of milk of lime, the mass then being ground up together in a wet condition. I have found that twenty-five per cent. of bauxite and about two per cent. of lime give very good results. This mixture after being ground up is molded and burned in the ordinary way, giving a brick which is much less friable and longer lived than the chrome bricks heretofore used.

It will be readily understood that the particular refractory clay and alkali matter employed, as well as their percentages, may be varied as desired, and that other materials may be added to the mixture without departing from my invention, since

I claim—

1. As a new article of manufacture, a brick containing chrome ore, a refractory clay, and alkali matter.

2. A brick composed of chrome ore, bauxite and lime.

In testimony whereof I have hereunto set my hand.

NIVEN McCONNELL.

Witnesses:
G. I. HOLDSHIP,
C. BYRNES.